United States Patent
Cui et al.

(10) Patent No.: US 12,124,810 B2
(45) Date of Patent: Oct. 22, 2024

(54) TEXT ADJUSTMENT METHOD, ELECTRONIC DEVICE AND STORAGE MEDIUM

(71) Applicants: Beijing Xiaomi Mobile Software Co., Ltd., Beijing (CN); Beijing Xiaomi Pinecone Electronics Co., Ltd., Beijing (CN)

(72) Inventors: Shiqi Cui, Beijing (CN); Li Deng, Beijing (CN); Bin Qin, Beijing (CN)

(73) Assignees: BEIJING XIAOMI MOBILE SOFTWARE CO., LTD., Beijing (CN); BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 284 days.

(21) Appl. No.: 17/452,977

(22) Filed: Oct. 29, 2021

(65) Prior Publication Data

US 2022/0335226 A1    Oct. 20, 2022

(30) Foreign Application Priority Data

Apr. 15, 2021    (CN) .......................... 202110407199.X (51) Int. Cl.
*G06F 40/40*    (2020.01)
*G06F 16/242*    (2019.01)
(Continued)

(52) U.S. Cl.
CPC ............ *G06F 40/40* (2020.01); *G06F 16/243* (2019.01); *G06F 40/20* (2020.01); *G06F 40/274* (2020.01);
(Continued)

(58) Field of Classification Search
CPC ...... G06F 40/20; G06F 40/274; G06F 40/279; G06F 40/30; G06F 40/35; G06F 16/2425; G06F 16/243
See application file for complete search history.

(56) References Cited

U.S. PATENT DOCUMENTS

2020/0380077 A1* 12/2020 Ge ........................ G10L 15/18
2020/0380991 A1* 12/2020 Ge ........................ G10L 15/22
2021/0027788 A1   1/2021 Xu et al.

FOREIGN PATENT DOCUMENTS

CN    110413746 A    11/2019
CN    111667829 A    9/2020
(Continued)

OTHER PUBLICATIONS

Ren et al., "Conversational query understanding using sequence to sequence modeling." Proceedings of the 2018 World Wide Web Conference. (Year: 2018).*
Xu et al., "Learning to Generate Reformulation Actions for Scalable Conversational Query Understanding." Proceedings of the 29th ACM International Conference on Information & Knowledge Management (Year: 2020).*

(Continued)

*Primary Examiner* — Samuel G Neway
(74) *Attorney, Agent, or Firm* — McCoy Russell LLP (57) ABSTRACT

A text adjustment method includes: obtaining a to-be-processed text; determining whether to adjust the to-be-processed text according to the to-be-processed text and a context text of the to-be-processed text; in response to determining to adjust the to-be-processed text, determining adjustment character information and adjustment position information of the to-be-processed text according to the context text; and determining an adjusted to-be-processed text according to the adjustment character information and the adjustment position information.

15 Claims, 5 Drawing Sheets

(51) Int. Cl.
*G06F 40/20* (2020.01)
*G06F 40/274* (2020.01)
*G06F 40/279* (2020.01)
*G06F 40/30* (2020.01)
*G06F 40/35* (2020.01)

(52) U.S. Cl.
CPC ............ *G06F 40/279* (2020.01); *G06F 40/30* (2020.01); *G06F 40/35* (2020.01); *G06F 16/2425* (2019.01)

(56) References Cited

FOREIGN PATENT DOCUMENTS

| CN | 11831806 A | 10/2020 |
|---|---|---|
| CN | 111783429 A | 10/2020 |
| CN | 111858894 A | 10/2020 |
| CN | 112380848 A | 2/2021 |
| CN | 112463942 A | 3/2021 |
| CN | 112466286 A | 3/2021 |

OTHER PUBLICATIONS

Rastogi, P. et al., "Scaling Multi-Domain Dialogue State Tracking via Query Reformulation," arXiv Cornell University Website, Available Online at https://arxiv.org/abs/1903.05164, Available as Early as Mar. 29, 2019, 9 pages.

Su, H. et al., "Improving Multi-turn Dialogue Modelling with Utterance ReWriter," arXiv Cornell University Website, Available Online at https://arxiv.org/abs/1906.07004, Available as Early as Jun. 14, 2019, 10 pages.

Hrinchuk, O. et al., "Correction of Automatic Speech Recognition With Transformer Sequence-To-Sequence Model," arXiv Cornell University Website, Available Online at https://arxiv.org/abs/1910.10697, Available as Early as Oct. 23, 2019, 5 pages.

Mani, A. et al., "ASR Error Correction and Domain Adaptation Using Machine Translation," Proceedings of the ICASSP 2020—2020 IEEE International Conference on Acoustics, Speech and Signal Processing (ICASSP), May 4, 2020, Barcelona, Spain, 5 pages.

* cited by examiner

TEXT ADJUSTMENT METHOD, ELECTRONIC DEVICE AND STORAGE MEDIUM

CROSS-REFERENCE TO RELATED APPLICATION

The present application claims priority to Chinese Patent Application No. 202110407199.X, filed on Apr. 15, 2021. The entire contents of the above-listed application is hereby incorporated by reference for all purposes.

BACKGROUND

In recent years, with continuous development of Natural Language Processing (NLP), a man-machine dialogue system, which is one of important research fields of NLP, has also received extensive attention. In a process of man-machine dialogue, a user can input a corresponding text according to own needs, and a machine will give a response based on the text input by the user.

SUMMARY

The present disclosure relates to the field of NLP. In order to overcome problems in the related art, the present disclosure provides a text adjustment method, an electronic device and a storage medium.

According to a first aspect of the present disclosure, a text adjustment method is provided, and includes:
obtaining a to-be-processed text;
determining whether to adjust the to-be-processed text according to the to-be-processed text and a context text of the to-be-processed text;
in response to determining to adjust the to-be-processed text, determining adjustment character information and adjustment position information of the to-be-processed text according to the context text; and
determining an adjusted to-be-processed text according to the adjustment character information and the adjustment position information.

According to a second aspect of the present disclosure, an electronic device is provided, and includes:
a processor; and
a memory configured to store instructions executable by the processor.

The processor is configured to implement a text adjustment method, including:
obtaining a to-be-processed text;
determining whether to adjust the to-be-processed text according to the to-be-processed text and a context text of the to-be-processed text;
in response to determining to adjust the to-be-processed text, determining adjustment character information and adjustment position information of the to-be-processed text according to the context text; and
determining an adjusted to-be-processed text according to the adjustment character information and the adjustment position information.

According to a third aspect of the present disclosure, a non-transitory computer-readable storage medium is provided, computer program instructions are stored on the computer-readable storage medium, and when the program instructions are executed by a processor, a text adjustment method is realized, and includes:
obtaining a to-be-processed text;
determining whether to adjust the to-be-processed text according to the to-be-processed text and a context text of the to-be-processed text;
in response to determining to adjust the to-be-processed text, determining adjustment character information and adjustment position information of the to-be-processed text according to the context text; and
determining an adjusted to-be-processed text according to the adjustment character information and the adjustment position information.

It should be understood that the above general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the disclosure.

DETAILED DESCRIPTION

Some embodiments will be described in detail herein, examples of which are illustrated in the accompanying drawings. When the following description refers to the accompanying drawings, the same numbers in different drawings represent the same or similar elements unless otherwise indicated. The implementations described in the following embodiments do not represent all implementations consistent with the disclosure. On the contrary, they are merely examples of apparatuses and methods consistent with some aspects of the disclosure.

Before introducing a text adjustment method, an electronic device, and a storage medium provided by the disclosure, the application scenarios related to various examples of the present disclosure are first described. The application scenarios may be any scenario that needs to use a context text of a certain text to adjust the text to improve the text. The application scenarios may be, for example, multi-round dialogue, intelligent retrieval, and article adjustment. Taking the application scenario as a multi-round dialogue scenario as an example, a user may input a to-be-processed text containing the user's specific needs into a dialogue system through a terminal, so that the dialogue system can adjust the to-be-processed text according to the text input by the user before inputting the to-be-processed text to improve the to-be-processed text so as to obtain an adjusted to-be-processed text. The terminal may be a mobile terminal such as a smart phone, a tablet computer, a smart watch, a smart bracelet and a personal digital assistant (PDA), or a fixed terminal such as a desktop computer.

Figure 1:
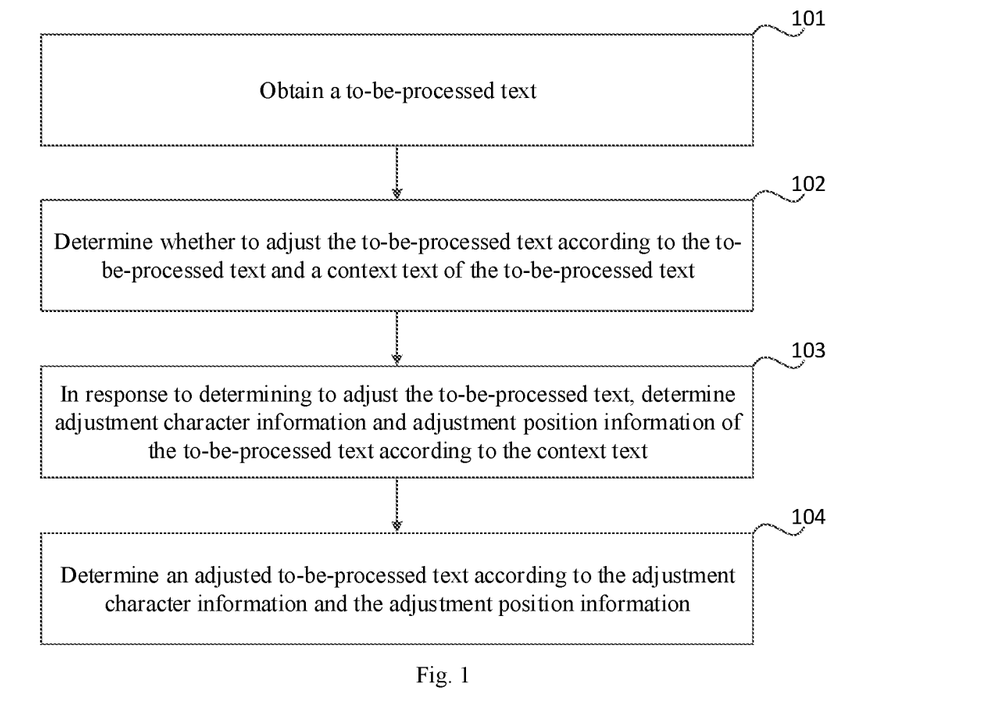
FIG. 1 is a flow chart showing a text adjustment method according to one or more examples of the present disclosure.

FIG. 1 is a flow chart showing a text adjustment method according to an example of the present disclosure. As shown in FIG. 1, the method may include:

In step 101, a to-be-processed text is obtained.

In step 102, whether to adjust the to-be-processed text is determined according to the to-be-processed text and a context text of the to-be-processed text.

For example, first, the to-be-processed text and the context text of the to-be-processed text may be obtained. The to-be-processed text may be a text input by the user, or a certain text in a text set including a plurality of texts (the text set may be, for example, an article). If the to-be-processed text is the text input by the user, the context text may include a text input by the user before the to-be-processed text is input, and/or a text input by the user after the to-be-processed text is input. If the to-be-processed text is the certain text in the text set, the context text may be a text adjacent to the text. For example, in a multi-round dialogue scenario, the to-be-processed text may be a dialogue statement input by the user in a current round of dialogue, that is, a query or a dialogue input by the current user, and at this time, the context text may be all historical dialogue statements input by the user in historical rounds of dialogue, that is, a query input by the user before. For another example, in a smart search scenario, the to-be-processed text may be a search statement input by the current user, and at this time, the context text may be a search statement input by the user before. For another example, in an article adjustment scenario, the to-be-processed text may be a certain text statement in an to-be-adjusted article, and at this time, the context text is a statement adjacent to the text statement.

Then, whether to adjust the to-be-processed text is determined according to the to-be-processed text and the context text. For example, a classification model configured to determine whether to adjust the to-be-processed text according to the to-be-processed text and the context text may be pre-trained, and the to-be-processed text and the context text are input into the trained classification model to obtain a result of whether to adjust the to-be-processed text and output by the classification model.

In step 103, in response to determining to adjust the to-be-processed text, adjustment character information and adjustment position information of the to-be-processed text are determined according to the context text.

In this step, after the to-be-processed text and the context text are obtained, the adjustment character information and the adjustment position information of the to-be-processed text may further be determined according to the context text. For example, an annotation model configured to determine the adjustment character information and the adjustment position information according to the to-be-processed text and the context text may be pre-trained, and the to-be-processed text and the context text are input into the trained annotation model to obtain the adjustment character information and the adjustment position information output by the annotation model. The adjustment character information is configured to indicate an adjustment mode corresponding to an adjustment character in the context text, the adjustment character may be understood as a character contained in a text fragment that needs to be configured to adjust the to-be-processed text in the context text, and the adjustment method is configured to represent a mode of adjusting the adjustment character into the to-be-processed text, for example, the adjustment mode may include a character insertion or a character replacement. The adjustment position information is configured to indicate a character position of a target character in the to-be-processed text, and the target character may be understood as a character at a position that needs to be adjusted in the to-be-processed text.

If it is determined that the to-be-processed text is adjusted, it is indicated that an expression of the to-be-processed text is complete, and the adjustment character information and the adjustment position information may be retained. If it is determined that the to-be-processed text is not adjusted, the adjustment character information and the adjustment position information are not considered, that is, the adjustment character information and the adjustment position information are not retained.

In step 104, the adjusted to-be-processed text is determined according to the adjustment character information and the adjustment position information.

For example, if it is determined that the to-be-processed text is not adjusted, the to-be-processed text may be directly used as the adjusted to-be-processed text. If it is determined that the to-be-processed text is adjusted, the to-be-processed text may be adjusted by the adjustment character information and the adjustment position information to obtain the adjusted to-be-processed text.

Taking the application scenario as a multi-round dialogue scenario as an example, if the user has two rounds of dialogue with the dialogue system, a dialogue statement input by the user in the first round of dialogue is "set an alarm clock at 8 o'clock in the evening", a dialogue statement input by the user in the second round of dialogue is "set another at 9 o'clock", the dialogue statement in the second round of dialogue is an incomplete statement, and the complete expression of the dialogue statement in the second round of dialogue should be "set another alarm clock at 9 o'clock". If "set an alarm clock at 8 o'clock in the evening" is taken as the context text, and "set another at 9 o'clock" is taken as the to-be-processed text, the "alarm clock" in the context text needs to be inserted behind "another" in the to-be-processed text, that is to say, adjustment characters in the context text are "alarm" and "clock", the adjustment mode is a character insertion, and the target character in the to-be-processed text is "another". Then the adjustment character information determined according to the context text is configured to indicate that the adjustment mode corresponding to "alarm" and "clock" is the character insertion, and the adjustment position information determined according to the context text is configured to indicate the character position of the character "another". If it is determined that the to-be-processed text is adjusted, the "alarm clock" in the context text is inserted behind the "another" in the to-be-processed text according to the determined to-be-processed text and the context text to obtain the adjusted to-be-processed text "set another alarm clock at 9 o'clock". After the adjusted to-be-processed text is obtained, corresponding actions may be performed according to the adjusted to-be-processed text. For example, in the multi-round dialogue scenario, the adjusted to-be-processed text may be sent to a Natural Language Understanding (NLU) model, an intent understanding result of the adjusted to-be-processed text output by the NLU model is obtained, and according to the intent understanding result, a response that meets the user's needs is given out.

According to the disclosure, first, the to-be-processed text is obtained, whether to adjust the to-be-processed text is determined according to the to-be-processed text and the context text of the to-be-processed text, and in response to determining to adjust the to-be-processed text, the adjustment character information and the adjustment position information of the to-be-processed text are determined according to the context text, and the adjusted to-be-processed text is determined according to the adjustment character information and the adjustment position information. According to the disclosure, the to-be-processed text is adjusted according to the adjustment character information and the adjustment position information determined according to the context text so as to obtain the adjusted to-be-processed text. It does not need to decode the entire adjusted to-be-processed text from scratch, the adjustment accuracy of the to-be-processed text is improved, and at the same time, the adjusted to-be-processed text with a high degree of completeness can be generated.

Figure 2:
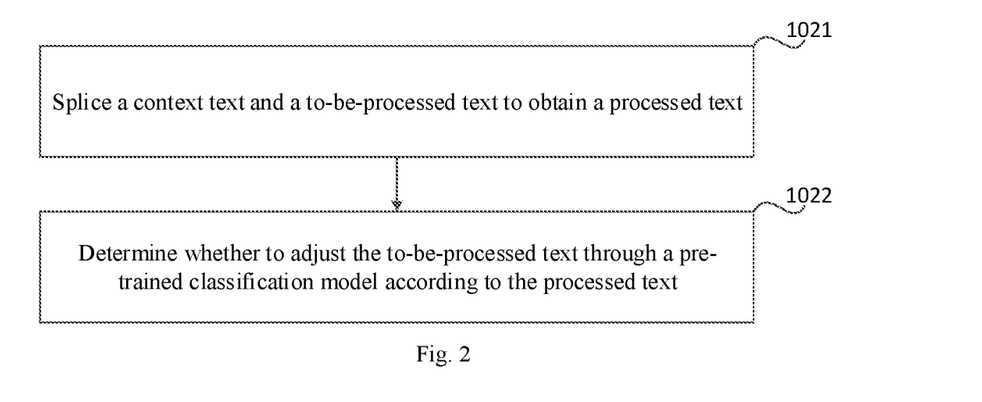
FIG. 2 is a flow chart showing another text adjustment method according to one or more examples of the present disclosure.

FIG. 2 is a flow chart showing another text adjustment method according to an example of the present disclosure. As shown in FIG. 2, step 102 may include:

In step 1021, the context text and the to-be-processed text are spliced to obtain a processed text.

In step 1022, whether to adjust the to-be-processed text is determined through the pre-trained classification model according to the processed text.

For example, the classification model may be pre-trained, and the classification model is configured to determine whether to adjust the to-be-processed text according to information contained in the context text and the to-be-processed text. After obtaining the context text and the to-be-processed text, the context text and the to-be-processed text may be spliced to obtain the processed text, and the processed text is input into the classification model to obtain a result of whether to adjust the to-be-processed text output by the classification model.

Figure 3:
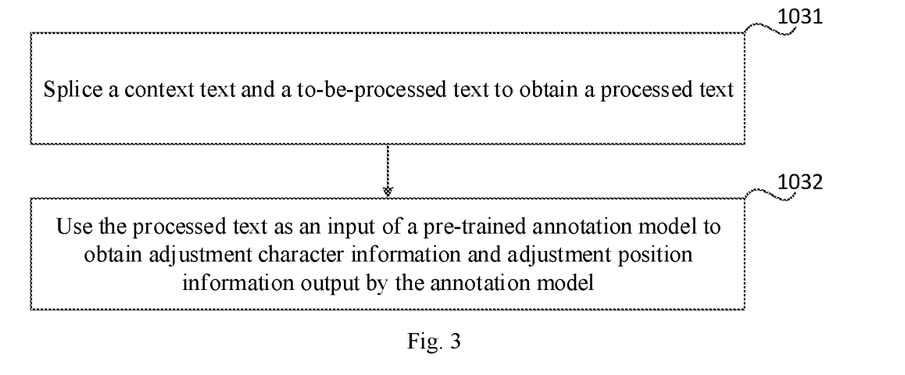
FIG. 3 is a flow chart showing another text adjustment method according to one or more examples of the present disclosure.

FIG. 3 is a flow chart showing another text adjustment method according to an example of the present disclosure. As shown in FIG. 3, step 103 may include:

In step 1031, the context text and the to-be-processed text are spliced to obtain a processed text.

In step 1032, the processed text is used as an input of the pre-trained annotation model to obtain the adjustment character information and the adjustment position information output by the annotation model.

For example, the annotation model may be pre-trained, and is configured to recognize the adjustment character in the context text and the target character in the to-be-processed text according to the information contained in the context text and the to-be-processed text, and output the adjustment character information and the adjustment position information according to a recognition result. After the context text and the to-be-processed text are obtained, the context text and the to-be-processed text may be spliced to obtain the processed text, and the processed text is input into the annotation model to obtain the adjustment character information and the adjustment position information output by the annotation model. In some examples, the adjustment character information includes a first adjustment label indicating the adjustment mode corresponding to the adjustment character in the context text, and the adjustment position information includes a second adjustment label indicating the character position of the target character, corresponding to the adjustment character, in the to-be-processed text.

In some examples, the determining the adjusted to-be-processed text according to the adjustment character information and the adjustment position information, may include:

the adjustment character is adjusted to a designated position corresponding to the character position to obtain the adjusted to-be-processed text according to the adjustment mode indicated by the first adjustment label.

For example, if it is determined that the to-be-processed text is adjusted, if the adjustment mode indicated by the first adjustment label is a character insertion, the adjustment character is inserted into the designated position corresponding to the character position to obtain the adjusted to-be-processed text. Or, if the adjustment mode indicated by the first adjustment label is a character replacement, the adjustment character is configured to replace the target character at the character position to obtain the adjusted to-be-processed text. The designated position corresponding to the character position may be a position between the target character and a next character of the target character, that is, the adjustment character is inserted between the target character and the next character of the target character.

Figure 4:
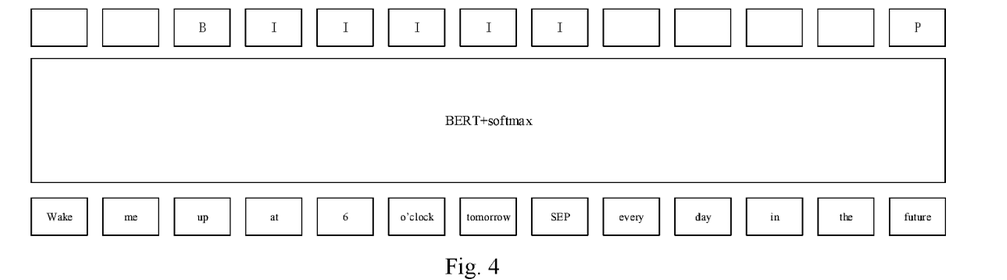
FIG. 4 is a schematic diagram showing adjustment for a to-be-processed text according to one or more examples of the present disclosure.

As shown in FIG. 4, SEP in FIG. 4 represents a separator, configured to separate the context text and the to-be-processed text. If "Wake me up at 6 o'clock tomorrow" is used as the context text and "every day in the future" is used as the to-be-processed text, the complete expression of the to-be-processed text should be "Wake me up at 6 o'clock every day in the future", at this moment, adjustment characters are "wake", "me", "up", "at", "6", and "o'clock", the target character is "every". The first adjustment label corresponding to the adjustment character "wake" may be represented by "B", the first adjustment label "B" is configured to indicate that the adjustment mode of the adjustment character is the character insertion, and the adjustment character is a first character in the text fragment that needs to be configured to adjust the to-be-processed text, and the first adjustment label corresponding to the adjustment characters "me", "up", "at", "6" and "o'clock" may be represented by "I", and the first adjustment label "I" is configured to indicate that the adjustment mode of the adjustment characters is the character insertion, and the adjustment characters are characters other than the first character in the text fragment that needs to be configured to adjust the to-be-processed text. Meanwhile, the second adjustment label corresponding to the target character "every" may be represented by "P", and the second adjustment label "P" is configured to indicate the character position of the target character. If it is determined to adjust the to-be-processed text, the adjustment mode indicated by the first adjustment labels "B" and "I" is the character insertion, the adjustment characters "wake", "me", "up", "at", "6", and "o'clock" in the context text may be inserted before the target character "every" in the to-be-processed text, and the adjusted to-be-processed text "Wake me up at 6 o'clock every day in the future" is obtained.

Figure 5:
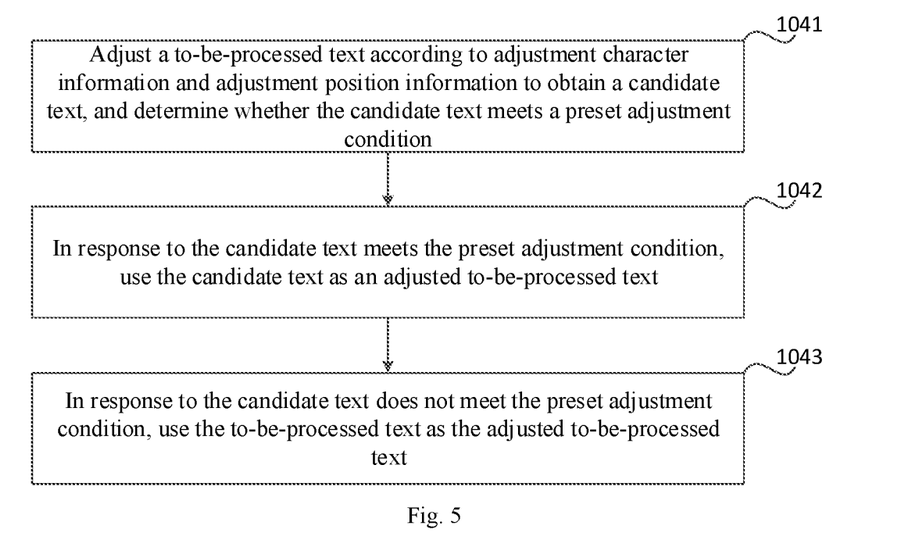
FIG. 5 is a flow chart showing another text adjustment method according to one or more examples of the present disclosure.

FIG. 5 is a flow chart showing another text adjustment method according to an example of the present disclosure. As shown in FIG. 5, step 104 may include:

In step 1041, the to-be-processed text is adjusted according to the adjustment character information and the adjustment position information to obtain a candidate text, and whether the candidate text meets a preset adjustment condition is determined.

In step 1042, in response to the candidate text meets the preset adjustment condition, the candidate text is used as the adjusted to-be-processed text.

In step 1043, in response to the candidate text does not meet the preset adjustment condition, the to-be-processed text is used as the adjusted to-be-processed text.

In a scenario, in order to further improve the adjustment accuracy of the to-be-processed text, a filter module may be added after the annotation model to filter out a grammatically irregular adjusted to-be-processed text and improve the quality of the adjusted to-be-processed text. Specifically, after determining the adjustment character information and the adjustment position information, the to-be-processed text may be adjusted according to the adjustment character information and the adjustment position information to obtain the candidate text. The mode of adjusting the to-be-processed text according to the adjustment character information and the adjustment position information has been described in the previous example, which will not be described in detail here. Then, the filter module determines whether the candidate text meets the preset adjustment condition. If the candidate text meets the preset adjustment condition, the candidate text is used as the adjusted to-be-processed text. If the candidate text does not meet the preset adjustment condition, the to-be-processed text is used as the adjusted to-be-processed text.

The preset adjustment condition is determined by a language model probability of the candidate text and a frequency of the candidate text being used by the user in history. For example, the preset adjustment condition may include any one or more of the following: 1) the language model probability corresponding to the candidate text determined according to a pre-built language model is greater than or equal to a preset probability threshold; or 2) the frequency corresponding to the candidate text is greater than or equal to a preset access frequency. The preset probability threshold and the preset access frequency may be set as needed, which is not limited in the disclosure. For example, the preset probability threshold may be set to be 0.2, and the preset access frequency may be set to be 10 times/month. The filter module uses the preset adjustment condition to judge the candidate text, in fact, whether the to-be-processed text adjusted according to the adjustment character information and the adjustment position information conforms to a grammatical specification is judged, so that an occurrence of the grammatically irregular adjusted to-be-processed text is avoided, and accordingly the adjustment accuracy of the to-be-processed text and the quality of the adjusted to-be-processed text are improved.

In some examples, the determining whether to adjust the to-be-processed text according to the to-be-processed text and the context text of the to-be-processed text, and the determining the adjustment character information and the adjustment position information of the to-be-processed text according to the context text are obtained by a text adjustment model.

The text adjustment model includes the classification model and the annotation model, the classification model is configured to determine whether to adjust the to-be-processed text according to the to-be-processed text and the context text, and the annotation model is configured to determine the adjustment character information and the adjustment position information according to the context text.

For example, the determining whether to adjust the to-be-processed text and the determining the adjustment character information and the adjustment position information may be done through the same model or through different models. For example, if the text adjustment model is configured to determine whether to adjust the to-be-processed text, and determine the adjustment character information and the adjustment position information, the text adjustment model may include the classification model and the annotation model (that is, the text adjustment model may execute tasks of the classification model and tasks of the annotation model), bottom layers of the classification model and the annotation model may both use a Bidirectional Encoder Representations from Transformers (BERT) model, and at the same time, a softmax layer may be added to a statement-level encoding output of the BERT model to realize the tasks of the classification model, and a softmax layer is added to a character-level encoding output of the BERT model to achieve the tasks of the annotation model. It should be noted that compared with a model based on an encoder-decoder framework, the use of the text adjustment model based on the BERT model and the softmax layer has lower requirements for a scale of annotation data during a training phase, and can reduce the acquisition cost of the annotation data. In addition, the classification model and the annotation model use the same BERT model, thus reducing the structural complexity of the text adjustment model. At the same time, the same BERT model does not require the classification model and the annotation model to perform feature encoding separately, the sharing of feature encoding can be achieved, and accordingly the training and prediction speed of the text adjustment model is improved.

Figure 6:
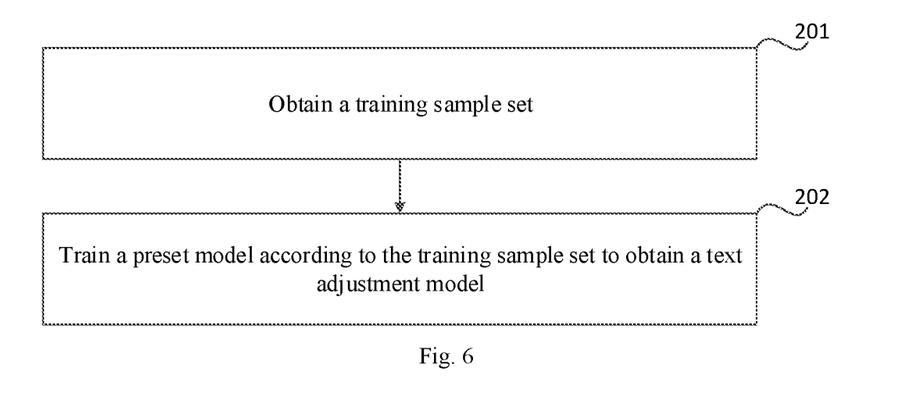
FIG. 6 is a flow chart training a text adjustment model according to one or more examples of the present disclosure.

FIG. 6 is a flow chart training a text adjustment model according to an example of the present disclosure. As shown in FIG. 6, the text adjustment model may be trained in a following manner:

In step 201, a training sample set is obtained.

The training sample set includes a training text, a training context text of the training text, training adjustment character information, and training adjustment position information.

In step 202, a preset model is trained according to the training sample set to obtain the text adjustment model.

For example, when training the text adjustment model, a corpus data set including a large quantity of texts may be obtained in advance, and then the corpus data set may be mined according to a preset rule to determine texts that are suspected to be adjusted in the corpus data set, and the texts that are suspected to be adjusted in the corpus data set are used as training to-be-processed texts. For example, in the multi-round dialogue scenario, all historical dialogues generated during a dialogue between the user and the dialogue system may be used as the corpus data set. In this case, the preset rule may be to select dialogues with similar segments as texts that are suspected to be adjusted.

Then, a context text of each training to-be-processed text may be obtained to be used as a training context text of the training to-be-processed text, and each training to-be-processed text and the training context text of the training to-be-processed text may be used as a training text. Then, each training text is manually annotated to annotate whether it is necessary to adjust the training to-be-processed text in the training text, and a correct adjustment result corresponding to the training to-be-processed text in the training text if adjustment is necessary, and generate training adjustment character information and training adjustment position information corresponding to the training text according to an annotation result. Finally, the training sample set is generated by using each training text and the training adjustment character information and the training adjustment position information corresponding to each training text, and the preset model is trained by using the training sample set through a multi-task mode so as to obtain the text adjustment model. The text adjustment model is trained through the multi-task mode, so that tasks to be performed by the classification model and tasks to be performed by the annotation model share the learned information in the learning process. Compared with a single-task learning mode, the generalization effect of the text adjustment model can be improved.

It should be noted that a certain proportion of training texts that do not need to be adjusted may be added as negative samples in the training sample set, so that the text adjustment model can learn a mode for not adjusting the to-be-processed text, so as to further improve the adjustment accuracy rate of the to-be-processed text.

Figure 7:
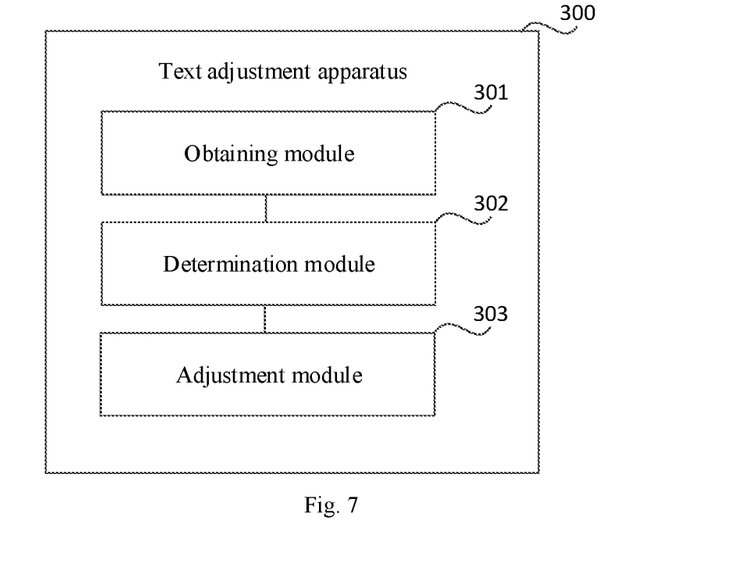
FIG. 7 is a schematic structural diagram showing a text adjustment apparatus according to one or more examples of the present disclosure.

FIG. 7 is a schematic structural diagram showing a text adjustment apparatus according to an example of the present disclosure. As shown in FIG. 7, the apparatus 300 includes an obtaining module 301, a determination module 302, and an adjustment module 303.

The obtaining module 301 is configured to obtain a to-be-processed text.

The determination module 302 is configured to determine whether to adjust the to-be-processed text according to the to-be-processed text and a context text of the to-be-processed text.

The determination module 302 is further configured to determine adjustment character information and adjustment position information of the to-be-processed text according to the context text in response to determining to adjust the to-be-processed text.

The adjustment module 303 is configured to determine an adjusted to-be-processed text according to the adjustment character information and the adjustment position information.

Figure 8:
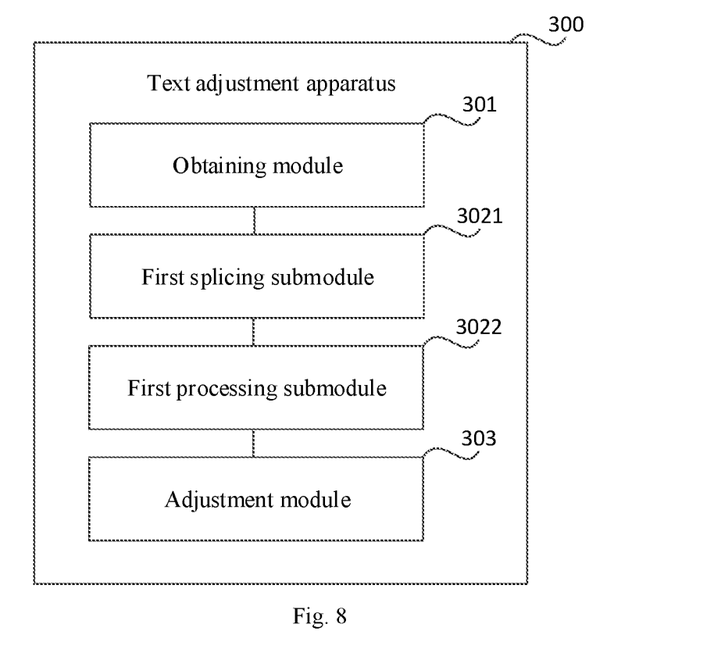
FIG. 8 is a schematic structural diagram showing another text adjustment apparatus according to one or more examples of the present disclosure.

FIG. 8 is a schematic structural diagram showing another text adjustment apparatus according to an example of the present disclosure. As shown in FIG. 8, the determination module 302 includes:

a first splicing submodule 3021, configured to splice the context text and the to-be-processed text to obtain a processed text, and a first processing submodule 3022, configured to determine whether to adjust the to-be-processed text through a pre-trained classification model according to the processed text.

Figure 9:
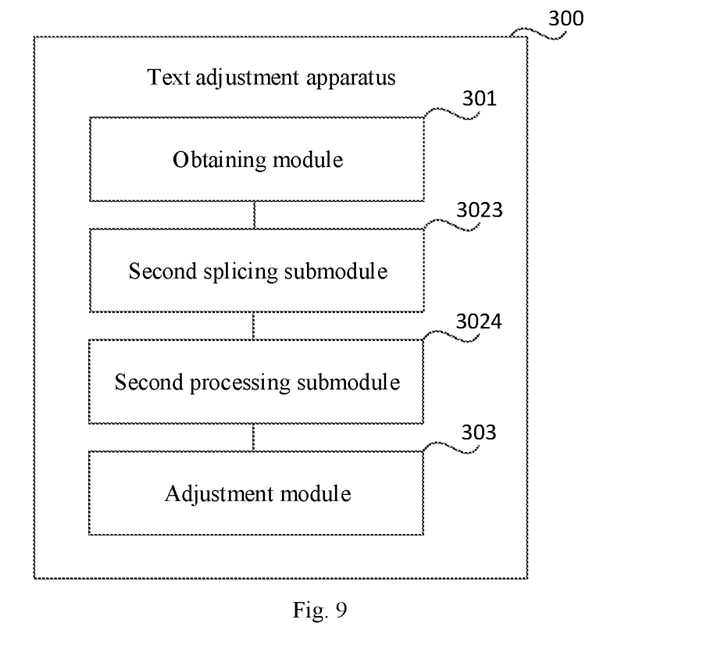
FIG. 9 is a schematic structural diagram showing another text adjustment apparatus according to one or more examples of the present disclosure.

FIG. 9 is a schematic structural diagram showing another text adjustment apparatus according to an example of the present disclosure. As shown in FIG. 9, the determination module 302 includes:

a second splicing submodule 3023, configured to splice the context text and the to-be-processed text to obtain a processed text, and a second processing submodule 3024, configured to use the processed text as an input of a pre-trained annotation model to obtain the adjustment character information and the adjustment position information output by the annotation model.

In some examples, the adjustment character information includes a first adjustment label indicating an adjustment mode corresponding to an adjustment character in the context text, and the adjustment position information includes a second adjustment label indicating a character position of a target character, corresponding to the adjustment character, in the to-be-processed text.

The adjustment module 303 is configured to:

adjust the adjustment character to a designated position corresponding to the character position to obtain the adjusted to-be-processed text according to the adjustment mode indicated by the first adjustment label.

In some examples, the adjustment module 303 is configured to:

insert the adjustment character into the designated position corresponding to the character position to obtain the adjusted to-be-processed text in response to the adjustment mode indicated by the first adjustment label is a character insertion.

In some examples, the adjustment module 303 is configured to:

replace the target character at the character position with the adjustment character to obtain the adjusted to-be-processed text in response to the adjustment mode indicated by the first adjustment label is a character replacement.

Figure 10:
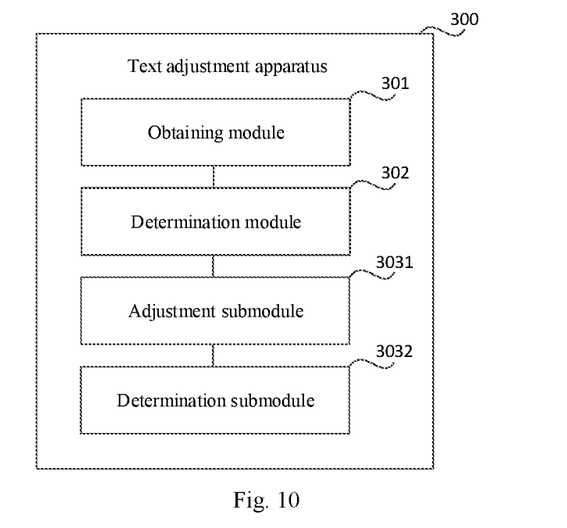
FIG. 10 is a schematic structural diagram showing another text adjustment apparatus according to one or more examples of the present disclosure.

FIG. 10 is a schematic structural diagram showing another text adjustment apparatus according to an example of the present disclosure. As shown in FIG. 10, the adjustment module 303 includes:

an adjustment submodule 3031, configured to adjust the to-be-processed text according to the adjustment character information and the adjustment position information to obtain a candidate text, and determine whether the candidate text meets a preset adjustment condition; and a determination submodule 3032, configured to use the candidate text as the adjusted to-be-processed text if the candidate text meets the preset adjustment condition.

The determination submodule 3032 is further configured to use the to-be-processed text as the adjusted to-be-processed text if the candidate text does not meet the preset adjustment condition.

In some examples, the preset adjustment condition includes:

a language model probability corresponding to the candidate text determined according to a pre-built language model is greater than or equal to a preset probability threshold; and/or, a frequency corresponding to the candidate text is greater than or equal to a preset access frequency.

In some examples, the determining whether to adjust the to-be-processed text according to the to-be-processed text and the context text of the to-be-processed text, and the determining the adjustment character information and the adjustment position information of the to-be-processed text according to the context text are obtained by a text adjustment model.

The text adjustment model includes a classification model and an annotation model, the classification model is configured to determine whether to adjust the to-be-processed text according to the to-be-processed text and the context text, and the annotation model is configured to determine the adjustment character information and the adjustment position information according to the context text.

In some examples, the text adjustment model is trained in a following manner:

A training sample set is obtained.

The training sample set includes a training text, a training context text of the training text, training adjustment character information, and training adjustment position information.

A preset model is trained according to the training sample set to obtain the text adjustment model.

With regard to the apparatus in the above-described example, the specific manner in which each module performs operations has been described in detail in the examples of the method, which will not be described in detail herein.

The present disclosure further provides a non-transitory computer-readable storage medium on which computer program instructions are stored, and when the program instructions are executed by a processor, the steps of the text adjustment method provided by the disclosure are realized.

Figure 11:
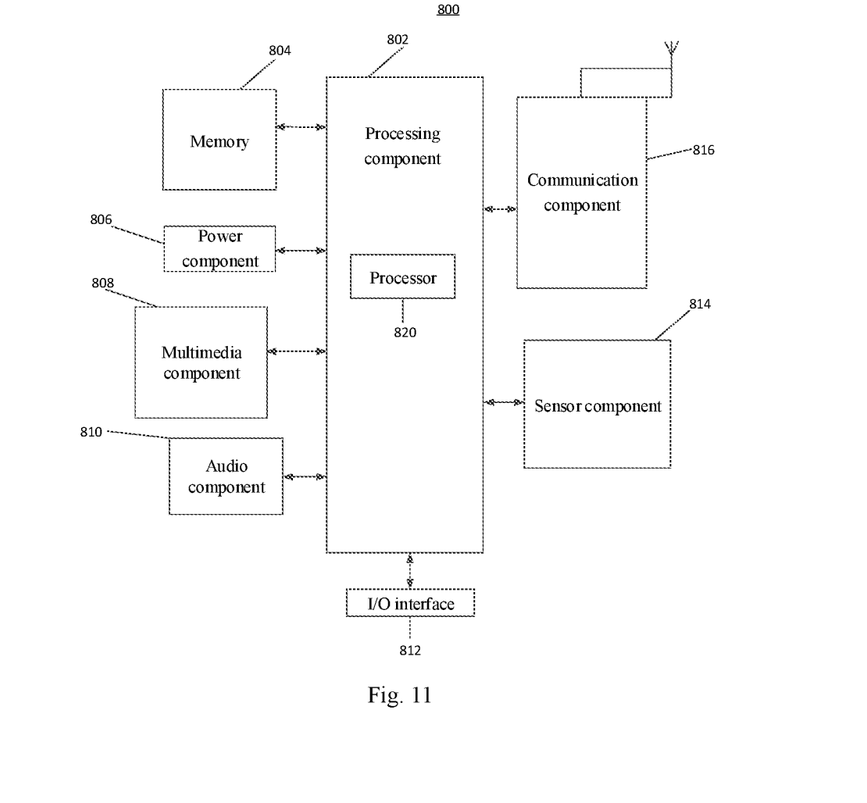
FIG. 11 is a block diagram showing an electronic device according to one or more examples of the present disclosure.

FIG. 11 is a block diagram showing an electronic device according to an example of the present disclosure. For example, the electronic device 800 may be a mobile phone, a computer, a digital broadcasting terminal, a message transceiver device, a game console, a tablet device, a medical device, a fitness device, a personal digital assistant, and the like.

Referring to FIG. 11, the electronic device 800 may include one or more of following components: a processing component 802, a memory 804, a power component 806, a multimedia component 808, an audio component 810, an Input/Output (I/O) interface 812, a sensor component 814, and a communication component 816.

The processing component 802 generally controls overall operations of the electronic device 800, such as operations associated with displaying, telephone calls, data communications, camera operations, and recording operations. The processing component 802 may include one or more processors 820 to execute instructions to complete all or part of the steps of the text adjustment method described above. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support operations on the electronic device 800. Examples of such data include instructions for any applications or methods operated on the electronic device 800, contact data, phonebook data, messages, pictures, videos, etc. The memory 804 may be implemented by any type of volatile or non-volatile memory devices, or combinations thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or compact disk.

The power component 806 provides power to the various components of the electronic device 800. The power component 806 may include a power management system, one or more power sources, and any other components associated with the generation, management and distribution of power in the electronic device 800.

The multimedia component 808 includes a screen that provides an output interface between the electronic device 800 and a user. In some examples, the screen may include a liquid crystal display (LCD) and a touch panel (TP). If it includes the TP, the screen may be implemented as a touch screen to receive an input signal from the user. The TP includes one or more touch sensors to sense touch, sliding, and gestures on the TP. The touch sensors may not only sense a boundary of a touch or sliding action, but also detect duration and pressure related to the touch or sliding operation. In some examples, the multimedia component 808 includes a front camera and/or a rear camera. The front camera and/or the rear camera may receive external multimedia data while the electronic device 800 is in an operation mode, such as a photographing mode or a video mode. Each front camera and each rear camera may be fixed optical lens systems or may have focal lengths and optical zoom capabilities.

The audio component 810 is configured to output and/or input audio signals. For example, the audio component 810 includes a microphone (MIC), and the microphone is configured to receive an external audio signal when the electronic device 800 is in an operation mode, such as a calling mode, a recording mode, and a voice identification mode. The received audio signal may be further stored in the memory 804 or transmitted via the communication component 816. In some examples, the audio component 810 further includes a speaker configured to output audio signals.

The I/O interface 812 provides an interface between the processing component 802 and peripheral interface modules, which may be keyboards, click wheels, buttons, etc. These buttons may include, but not limited to: a home button, a volume button, a start button, and a lock button.

The sensor component 814 includes one or more sensors configured to provide various aspects of state assessment for the electronic device 800. For example, the sensor component 814 may detect an open/closed state of the electronic device 800, and relative positioning of components such as a display and a keypad of the electronic device 800. The sensor component 814 may further detect a change in position of the electronic device 800 or a component of the electronic device 800, presence or absence of contact between the user and the electronic device 800, an orientation or acceleration/deceleration of the electronic device 800, and a change in temperature of the electronic device 800. The sensor component 814 may include a proximity sensor configured to detect the existence of objects nearby without any physical contact. The sensor component 814 may further include light sensors, such as CMOS or CCD image sensors, for use in imaging applications. In some examples, the sensor component 814 may further include an acceleration sensor, a gyroscope sensor, a magnetic sensor, a pressure sensor, or a temperature sensor.

The communication component 816 is configured to facilitate a wired or wireless communication between the electronic device 800 and other devices. The electronic device 800 may access a wireless network based on a communication standard, such as WiFi, 2G or 3G, or combinations thereof. In one example, the communication component 816 receives broadcast signals or broadcast related information from an external broadcast management system via a broadcast channel. In one example, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In some examples, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above text adjustment method.

In some examples, there is also provided a non-transitory computer-readable storage medium including instructions, such as the memory 804 including instructions, which may be executed by the processor 820 of the electronic device 800 to perform the above text adjustment method. For example, the non-transitory computer-readable storage medium may be a Read Only Memory (ROM), a Random Access Memory (RAM), a Compact Disc Read Only Memory (CD-ROM), a magnetic tape, a floppy disk, an optical data storage device, and the like.

In another example, there is also provided a computer program product, the computer program product includes a computer program that may be executed by a programmable device, and the computer program has a code portion for executing the above text adjustment method when executed by the programmable device.

Other implementation solutions of the present disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and examples are considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure is only limited by the appended claims.

The invention claimed is:

1. A text adjustment method, comprising:
   obtaining a to-be-processed text, wherein the to-be-processed text comprises at least one of: a dialogue text input by the user; a search statement input by the user; or a certain text in a text set including a plurality of texts;
   determining whether to adjust the to-be-processed text according to the to-be-processed text and a context text of the to-be-processed text;
   in response to determining to adjust the to-be-processed text, determining adjustment character information and adjustment position information of the to-be-processed text according to the context text;
   wherein the determining whether to adjust the to-be-processed text according to the to-be-processed text and the context text of the to-be-processed text, and the determining the adjustment character information and the adjustment position information of the to-be-processed text according to the context text are obtained by a text adjustment model, wherein the text adjustment model is trained in a following manner:
      obtaining a training sample set, wherein the training sample set comprises a training text, a training context text of the training text, training adjustment character information, and training adjustment position information; and
      training a preset model according to the training sample set to obtain the text adjustment model;
   determining an adjusted to-be-processed text according to the adjustment character information and the adjustment position information;
   wherein the adjustment character information comprises a first adjustment label indicating an adjustment mode corresponding to an adjustment character in the context text, and the adjustment position information comprises a second adjustment label indicating a character position of a target character, corresponding to the adjustment character, in the to-be-processed text; and
   the determining the adjusted to-be-processed text according to the adjustment character information and the adjustment position information comprises:
      adjusting the adjustment character to a designated position corresponding to the character position to obtain the adjusted to-be-processed text according to the adjustment mode indicated by the first adjustment label;
   wherein the determining the adjusted to-be-processed text according to the adjustment character information and the adjustment position information comprises:
      adjusting the to-be-processed text according to the adjustment character information and the adjustment position information to obtain a candidate text, and determining whether the candidate text meets a preset adjustment condition;
      in response to the candidate text meets the preset adjustment condition, using the candidate text as the adjusted to-be-processed text; and
      in response to the candidate text does not meet the preset adjustment condition, using the to-be-processed text as the adjusted to-be-processed text.

2. The method according to claim 1, wherein the determining whether to adjust the to-be-processed text according to the to-be-processed text and the context text of the to-be-processed text, comprises:
   splicing the context text and the to-be-processed text to obtain a processed text; and
   determining whether to adjust the to-be-processed text through a pre-trained classification model according to the processed text.

3. The method according to claim 1, wherein the determining the adjustment character information and the adjustment position information of the to-be-processed text according to the context text, comprises:
   splicing the context text and the to-be-processed text to obtain a processed text; and
   using the processed text as an input of a pre-trained annotation model to obtain the adjustment character information and the adjustment position information output by the annotation model.

4. The method according to claim 1, wherein the adjusting the adjustment character to the designated position corresponding to the character position to obtain the adjusted to-be-processed text according to the adjustment mode indicated by the first adjustment label, comprises:
   in response to the adjustment mode indicated by the first adjustment label is a character insertion, inserting the adjustment character into the designated position corresponding to the character position to obtain the adjusted to-be-processed text.

5. The method according to claim 1, wherein the adjusting the adjustment character to the designated position corresponding to the character position to obtain the adjusted to-be-processed text according to the adjustment mode indicated by the first adjustment label, comprises:
  in response to the adjustment mode indicated by the first adjustment label is a character replacement, replacing the target character at the character position with the adjustment character to obtain the adjusted to-be-processed text.

6. The method according to claim 1, wherein the preset adjustment condition comprises at least one of:
  a language model probability corresponding to the candidate text determined according to a pre-built language model is greater than or equal to a preset probability threshold;
  a frequency corresponding to the candidate text is greater than or equal to a preset access frequency.

7. The method according to claim 1, wherein
  the text adjustment model comprises a classification model and an annotation model, the classification model is configured to determine whether to adjust the to-be-processed text according to the to-be-processed text and the context text, and the annotation model is configured to determine the adjustment character information and the adjustment position information according to the context text.

8. An electronic device, comprising:
  a processor; and
  a memory configured to store instructions executable by the processor; wherein
  the processor is configured to implement a text adjustment method comprising:
    obtaining a to-be-processed text, wherein the to-be-processed text comprises at least one of: a dialogue text input by the user; a search statement input by the user; or a certain text in a text set including a plurality of texts;
    determining whether to adjust the to-be-processed text according to the to-be-processed text and a context text of the to-be-processed text;
    in response to determining to adjust the to-be-processed text, determining adjustment character information and adjustment position information of the to-be-processed text according to the context text;
    wherein the determining whether to adjust the to-be-processed text according to the to-be-processed text and the context text of the to-be-processed text, and the determining the adjustment character information and the adjustment position information of the to-be-processed text according to the context text are obtained by a text adjustment model, wherein the text adjustment model is trained in a following manner:
      obtaining a training sample set, wherein the training sample set comprises a training text, a training context text of the training text, training adjustment character information, and training adjustment position information; and
      training a preset model according to the training sample set to obtain the text adjustment model; and
    determining an adjusted to-be-processed text according to the adjustment character information and the adjustment position information;
    wherein the adjustment character information comprises a first adjustment label indicating an adjustment mode corresponding to an adjustment character in the context text, and the adjustment position information comprises a second adjustment label indicating a character position of a target character, corresponding to the adjustment character, in the to-be-processed text; and
    the processor is configured to implement the determining the adjusted to-be-processed text according to the adjustment character information and the adjustment position information by:
      adjusting the adjustment character to a designated position corresponding to the character position to obtain the adjusted to-be-processed text according to the adjustment mode indicated by the first adjustment label;
    wherein the processor is configured to implement the determining the adjusted to-be-processed text according to the adjustment character information and the adjustment position information by:
      adjusting the to-be-processed text according to the adjustment character information and the adjustment position information to obtain a candidate text, and determining whether the candidate text meets a preset adjustment condition;
      in response to the candidate text meets the preset adjustment condition, using the candidate text as the adjusted to-be-processed text; and
      in response to the candidate text does not meet the preset adjustment condition, using the to-be-processed text as the adjusted to-be-processed text.

9. The electronic device according to claim 8, wherein the processor is configured to implement the determining whether to adjust the to-be-processed text according to the to-be-processed text and the context text of the to-be-processed text by:
  splicing the context text and the to-be-processed text to obtain a processed text; and
  determining whether to adjust the to-be-processed text through a pre-trained classification model according to the processed text.

10. The electronic device according to claim 8, wherein the processor is configured to implement the determining the adjustment character information and the adjustment position information of the to-be-processed text according to the context text by:
  splicing the context text and the to-be-processed text to obtain a processed text; and
  using the processed text as an input of a pre-trained annotation model to obtain the adjustment character information and the adjustment position information output by the annotation model.

11. The electronic device according to claim 8, wherein the processor is configured to implement the adjusting the adjustment character to the designated position corresponding to the character position to obtain the adjusted to-be-processed text according to the adjustment mode indicated by the first adjustment label by:
  in response to the adjustment mode indicated by the first adjustment label is a character insertion, inserting the adjustment character into the designated position corresponding to the character position to obtain the adjusted to-be-processed text.

12. The electronic device according to claim 8, wherein the processor is configured to implement the adjusting the adjustment character to the designated position corresponding to the character position to obtain the adjusted to-be-processed text according to the adjustment mode indicated by the first adjustment label by:
  in response to the adjustment mode indicated by the first adjustment label is a character replacement, replacing the target character at the character position with the adjustment character to obtain the adjusted to-be-processed text.

13. The electronic device according to claim 8, wherein the preset adjustment condition comprises at least one of:
   a language model probability corresponding to the candidate text determined according to a pre-built language model is greater than or equal to a preset probability threshold;
   a frequency corresponding to the candidate text is greater than or equal to a preset access frequency.

14. The electronic device according to claim 8, wherein the text adjustment model comprises a classification model and an annotation model, the classification model is configured to determine whether to adjust the to-be-processed text according to the to-be-processed text and the context text, and the annotation model is configured to determine the adjustment character information and the adjustment position information according to the context text.

15. A non-transitory computer-readable storage medium, on which computer program instructions are stored, wherein when the program instructions are executed by a processor, a text adjustment method is realized, and comprises:
   obtaining a to-be-processed text, wherein the to-be-processed text comprises at least one of: a dialogue text input by the user; a search statement input by the user; or a certain text in a text set including a plurality of texts;
   determining whether to adjust the to-be-processed text according to the to-be-processed text and a context text of the to-be-processed text;
   in response to determining to adjust the to-be-processed text, determining adjustment character information and adjustment position information of the to-be-processed text according to the context text;
   wherein the determining whether to adjust the to-be-processed text according to the to-be-processed text and the context text of the to-be-processed text, and the determining the adjustment character information and the adjustment position information of the to-be-processed text according to the context text are obtained by a text adjustment model, wherein the text adjustment model is trained in a following manner:
      obtaining a training sample set; wherein the training sample set comprises a training text, a training context text of the training text, training adjustment character information, and training adjustment position information; and
      training a preset model according to the training sample set to obtain the text adjustment model;
   determining an adjusted to-be-processed text according to the adjustment character information and the adjustment position information;
   wherein the adjustment character information comprises a first adjustment label indicating an adjustment mode corresponding to an adjustment character in the context text, and the adjustment position information comprises a second adjustment label indicating a character position of a target character, corresponding to the adjustment character, in the to-be-processed text; and
   the determining the adjusted to-be-processed text according to the adjustment character information and the adjustment position information, comprises:
      adjusting the adjustment character to a designated position corresponding to the character position to obtain the adjusted to-be-processed text according to the adjustment mode indicated by the first adjustment label;
   wherein the determining the adjusted to-be-processed text according to the adjustment character information and the adjustment position information comprises:
      adjusting the to-be-processed text according to the adjustment character information and the adjustment position information to obtain a candidate text, and determining whether the candidate text meets a preset adjustment condition;
      in response to the candidate text meets the preset adjustment condition, using the candidate text as the adjusted to-be-processed text; and
      in response to the candidate text does not meet the preset adjustment condition, using the to-be-processed text as the adjusted to-be-processed text.

* * * * *